United States Patent [19]
Taylor et al.

[11] Patent Number: 5,715,654
[45] Date of Patent: Feb. 10, 1998

[54] METHOD FOR PACKAGING THERMOPLASTIC COMPOSITIONS USING A THERMALLY CONDUCTIVE RIGID MOLD

[75] Inventors: Malcolm Taylor, Pepperell, Mass.; George Bateson, Fridley, Minn.; Brian Posner, West Paducah, Ky.; Glenn Heuer, Forest Lake, Minn.

[73] Assignee: H. B. Fuller Licensing and Financing Inc., St. Paul, Minn.

[21] Appl. No.: 484,549

[22] Filed: Jun. 7, 1995

[51] Int. Cl.$^6$ .................. B65B 47/10; B65B 63/08
[52] U.S. Cl. .................. 53/440; 53/453; 264/255; 264/338
[58] Field of Search .................. 264/255, 266, 264/268, 338; 53/440, 453, 122, 127, 559, 140

[56] References Cited

U.S. PATENT DOCUMENTS

| | | | |
|---|---|---|---|
| 2,762,504 | 9/1956 | Sparks et al. | 206/84 |
| 4,054,632 | 10/1977 | Franke | 264/145 |
| 4,306,657 | 12/1981 | Levy | 206/447 |
| 4,748,796 | 6/1988 | Viel | 53/411 |
| 4,755,245 | 7/1988 | Viel | 156/227 |
| 5,257,491 | 11/1993 | Rouyer et al. | 53/428 |
| 5,307,608 | 5/1994 | Muir et al. | |
| 5,401,455 | 3/1995 | Hatfield | 264/255 |

FOREIGN PATENT DOCUMENTS

| | | |
|---|---|---|
| 2 544 653 | 4/1983 | France. |
| 2 544 654 | 4/1983 | France. |
| 2 601 616 | 7/1986 | France. |
| 2 248 046 | 9/1972 | Germany. |
| 36 25 358 | 7/1986 | Germany. |
| 86 28 513 U | 10/1986 | Germany. |
| 87 10 132 U | 7/1987 | Germany. |
| 48-103635 | 12/1973 | Japan. |
| WO 94/13451 | 6/1994 | WIPO. |

*Primary Examiner*—Linda Johnson
*Attorney, Agent, or Firm*—Carolyn A. Fischer; Nancy N. Quan

[57] ABSTRACT

A process of continuously packaging a thermoplastic composition such as a pressure sensitive hot melt adhesive. The method includes the steps of (a) forming a thermoplastic film to a rigid mold wherein said film becomes molten at or below the usage temperature of a hot melt adhesive composition, and the mold is in contact with ambient air; (b) dispensing hot melt adhesive into the lined mold; (c) disposing a thermoplastic film on the surface of the mold to form a packaged hot melt adhesive; (d) allowing the hot melt adhesive to reach a state in the presence of ambient air such that the packaged hot melt adhesive is removable from the mold.

9 Claims, 2 Drawing Sheets

METHOD FOR PACKAGING THERMOPLASTIC COMPOSITIONS USING A THERMALLY CONDUCTIVE RIGID MOLD

FIELD OF THE INVENTION

The present invention relates to an apparatus and a method for the continuous packaging of thermoplastic compositions, particularly hot melt adhesive compositions. More specifically it relates to an apparatus and a method for continuous packaging of thermoplastic pressure sensitive hot melt adhesive compositions by means of a rigid mold, especially a thermally conductive rigid mold.

DESCRIPTION OF THE ART

Thermoplastic compositions, such as hot melt adhesives, are substantially solid at room temperature and typically applied in a molten or flowable state. Hot melt adhesives are supplied as pellets, or pillows as disclosed in German patent 22 48 046, or blocks. Providing hot melt adhesives in these forms becomes increasing difficult if the thermoplastic composition is pressure sensitive. Pressure sensitive adhesives tend to adhere to hands, manufacturing equipment, and such adhesives having a low softening point tend to block together into a single solid mass, rendering such adhesives very difficult to be handled by the end user. Many approaches have been taken to provide pressure sensitive adhesives that are non-blocking and tackless to the touch.

French Patent 2,544,654 published Oct. 26, 1984 discloses forming a tackless hot melt by adding molten hot melt to a mold containing a preformed support layer having a transfer film which is compatible with the hot melt.

U.S. Pat. Nos. 4,748,796 issued Jun. 12, 1988 and 4,755,245 issued Jul. 5, 1988 disclose forming a protective coating for an adhesive material by electrostatically coating a mold or cavity with a powder screen and then pouring hot melt into the mold.

French Patent 2,601,616 published Oct. 22, 1988 discloses forming blocks of hot melt pressure sensitive adhesives by casting the adhesive into molds precoated by spraying with a film of non self-sticking hot melt material.

German patents DE 31 38 222, DE 32 34 065, and 36 25 358 teach coating or wrapping a formed hot melt block with various types of film.

All the later methods have suffered by virtue of either the need to unwrap the packaged hot melts or by virtue of contamination caused by the build up over time of large quantities of the packaging materials in the melt pot and hot melt application equipment.

Rouyer et al. U.S. Pat. No. 5,257,491 teaches a method of packaging an adhesive composition wherein the adhesive composition is sufficiently solidified or plastified.

Hatfield et al., U.S. Pat. 5,401,455 issued Mar. 28, 1995 teaches a method for packaging hot melt adhesive compositions comprising the use of a mold being in contact with a refrigerant gas or liquid heat sink. Hatfield teaches that when a hot melt adhesive is poured into a cavity lined with film in its molten state, the adhesive is fused to some extent into the film. Hatfield states that the fusion of the film and hot melt allows some mixing and compatibilizing of the film, improving the opportunity for more complete mixing. Hatfield also states that the entrapment of air has been blamed for incomplete melting and blending of the packaging film with the hot melt adhesive. However, the use of refrigerants is expensive and can create environmental concerns. Other heat sinks taught by Hatfield employ lining the mold with a flexible wetted absorbent substrate prior to inserting the thermoplastic film. Having the adhesive film in direct contact with water creates other disadvantages, particularly moisture contamination of the packaged hot melt adhesive which in turn creates foaming upon melting of the packaged hot melt adhesive. Water contamination becomes of particular concern during the packaging of water sensitive thermoplastic materials with water sensitive thermoplastic films. Such films absorb water causing the film to soften and become tacky. The film surfaces may in turn bond to one another resulting in the forming of a solid mass of adhesive.

Therefore, a need exists for a more effective and less costly method to package pressure sensitive hot melt adhesives without the need for refrigerants or water. The applicants have found that hot melt adhesives can be continuously packaged at ambient temperatures without the use of refrigerants or water.

SUMMARY OF THE INVENTION

The present invention is directed to a method of packaging thermoplastic compositions in a continuous process, and without the need of refrigerants or water, and an apparatus thereof. The process is especially suited for thermoplastic compositions such as pressure sensitive hot melt adhesives. The thermoplastic compositions are packaged in convenient packages without the use of refrigerants or water. The process comprises the steps of:

a. lining a rigid mold with a thermoplastic film wherein said film becomes molten at or below the usage temperature of a hot melt adhesive, and said mold is in contact with ambient air;

b. dispensing a hot melt adhesive into the lined mold;

c. disposing a layer of thermoplastic film on the surface of the mold to form a packaged hot melt adhesive;

d. allowing the hot melt adhesive to reach a state in the presence of ambient air such that the packaged hot melt adhesive is removable from said mold.

After cooling or sufficiently solidifying, the packaged hot melt adhesive is readily removed from subsequent molds and adjacent cavities. The thermoplastic film material used in the mold cavity can be the same or different composition than the film layer disposed on the surface of the mold, as long as both film materials become molten at or below the usage temperature of the adhesive. The individually packaged adhesive composition can further be combined into a larger package using a thermoplastic packaging film having the same or different characteristics as the films lining the mold cavity and disposed on the surface thereof.

The apparatus comprises:

a. a guiding means having at least one idler and at least one guide through which a thermoplastic film can be fed under proper tension and alignment;

b. a conveying means for conveying a rigid mold having at least one cavity;

c. a forming station for forming the thermoplastic film to the mold cavity;

d. a filling means having at least one filling head for dispensing a molten thermoplastic composition into the lined mold; and e. a means for disposing a second fill on top of the thermoplastic composition to form a sealed package.

Alternatively, in-line fill forming can replace the guiding means and forming station.

DETAILED DESCRIPTION OF THE INVENTION

Figure 1A:
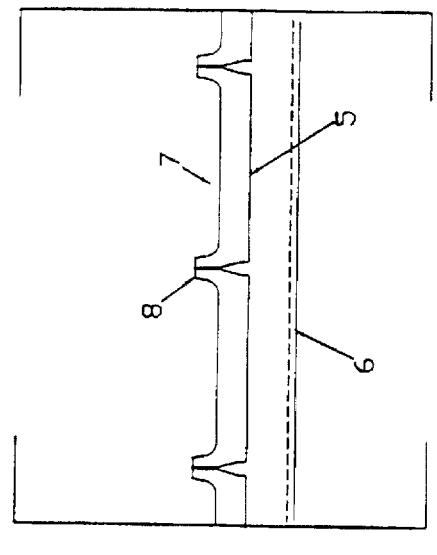
FIG. 1a is an enlarged sectional view of the circled region 1a of FIG. 1.
Figure 1:
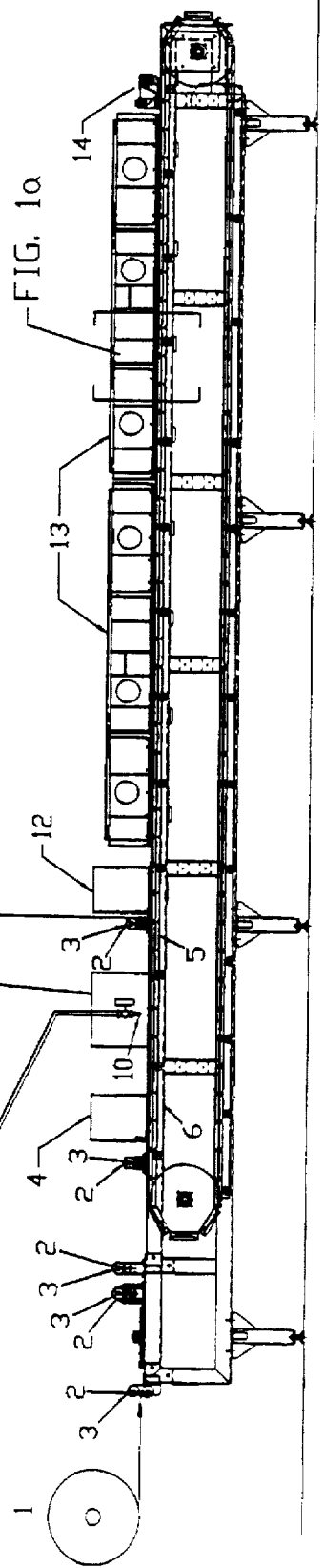
FIG. 1 is a side view of a first embodiment of the invention.
Figure 2A:
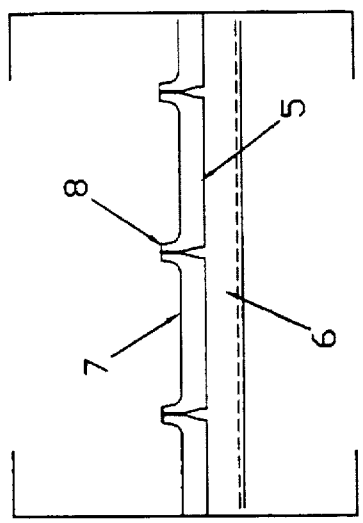
FIG. 2a is an enlarged sectional view of the circled region 2a of FIG. 2.
Figure 2:
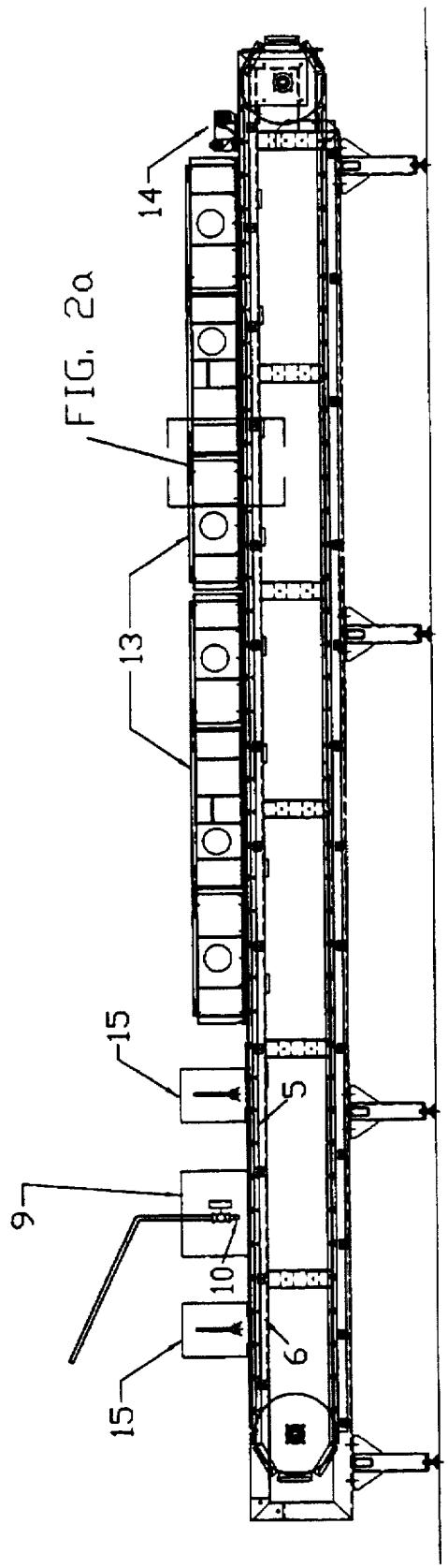
FIG. 2 is a side view of a second embodiment of the invention.

FIGS. 1 and 2 depict the apparatus of the present invention. FIG. 2 is an alternate embodiment of the invention. The primary difference being that the first and second fills are disposed in-line as thermoplastic compositions rather than the film being provided as a finished good on a roll. Various thermoplastic application equipment is suitable for disposing a substantially continuous fill in-line such as hot melt adhesive spray applicators, meltblown hot melt adhesive applicators, slot die applicators, extruders, etc. Obviously, one could combine the use of premanufactured and in-line fills in various combinations.

An alternate embodiment envisioned, not specifically depicted, but entirely within the scope of the present invention, includes eliminating the second film feeding station by forming an attached cover at an outermost lip of the mold at the film forming station. Once the mold cavity had been filled the cover could be placed on the surface serving the function of the second fill. Alternatively, the mold cavity may be partially filled. The excess film on the cavity walls can be used to cover the surface. Furthermore, the applicants envision eliminating the second film altogether and bonding the uncovered surfaces to each other.

A first thermoplastic fill (1) is fed from through a series of idlers (2) and web guides (3) to insure that the fill is properly tensioned and aligned. The film can be supplied in roll form or it can be made in-line by any film forming means immediately prior to being filled, such as by using hot melt spray equipment (15) to form the film as illustrated in FIG. 2.

The film enters the film forming station (4) where the film is disposed on the top of the inside cavity of a rigid mold (5) which is attached to a conveyor (6). The rigid mold has at least one cavity (7) and a lip (8) surrounding the top surface of each cavity. The film is formed to the cavity and lip of the mold such that the interface between the film and mold cavity is substantially free of voids. Preferably the film is vacuum formed to the mold.

The mold is conveyed to a filling station (9) having at least one filling head (10) which dispenses a molten thermoplastic composition into the lined cavity. Preferably, the filling station is located above the mold such that the thermoplastic composition can be dispensed by gravity.

The heat transfer characteristics of the mold are critical to the speed at which the present invention can operate. The molds are preferably made of a thermally conductive material, such as copper, stainless steel, and preferably aluminum. One skilled in the art could also create a variety of thermally conductive materials by disposing a conductive medium, such as a metal or thermally conductive composite, within a nonconductive medium, such as a plastic.

The actual shape of the mold cavity is not critical, but preferably the mold is substantially rectangular to facilitate placing the packaged thermoplastic composition in a substantially rectangular shipping container, such as a box.

In the preferred embodiment, each mold cavity is designed such that the shortest dimension of the resulting thermoplastic mass is less than one half the distance of the next shortest dimension. In a most preferred embodiment, the process is designed in such a way that each mold cavity can be filled to a fixed weight, such as one pound. This can be a significant advantage since it eliminates the need to weigh the contents of each receptacle containing numerous individual packages. Each mold cavity having the proper dimensions can enable the heat from the molten thermoplastic composition to dissipate through the mold into ambient air in a relatively short period of time thus making the process continuous. Preferably, the dimensions of the thermoplastic mass is such that the distance from the center of the mass to nearest surface is less than about 1–, more preferably less than ½" for higher manufacturing throughput. The mold cavity could be partially filled to meet the heat transfer requirements.

The mold is then conveyed for a length of time, said length of time being dependent of the dimensions of the resulting thermoplastic mass, preferably until the surface of the molten thermoplastic composition has sufficiently cooled such that the molten composition will not melt a second film (11) disposed on the top surface thereof. Alternatively, the second film can melt or be applied in a molten state as long as the resulting top surface is substantially tack free upon cooling of the film. The second film is disposed on the top of the mold, a sealing means (12) seals the first and second film surfaces together at the lip of the mold such that the thermoplastic composition is substantially enclosed on all surfaces with fill to form a packaged thermoplastic composition.

Sealing the first and second films together can be achieved by various methods including ultrasonic welding or adhesive bonding. Where the second film is disposed as a thermoplastic composition the seal will be made during the application of the second film, eliminating the need for a separate sealing station. In the preferred embodiment the film is sealed with an impulse heat sealer.

The mold is then conveyed for a length of time during which air hoods (13) direct ambient air on the mold. Ambient air is defined as about 75° F. Preferably the air is blown in a direction substantially perpendicular to the mold until the packaged thermoplastic composition has sufficiently cooled or solidified such that it will substantially maintain its shape when removed from the mold. The packaged thermoplastic composition is then conveyed to a cutter (14) that cuts the bonded film at the lip of the mold separating the packaged thermoplastic composition from subsequent molds and adjacent cavities.

Separating the packaged thermoplastic composition from subsequent molds and adjacent cavities is preferably achieved with a razor knife slitter. Other means for cutting include the use of mechanical scissors, a driven slitter wheel, laser cutters or a heated wire or knife. In an alternate embodiment, not depicted here but entirely within the scope of the present invention, the film may be cut immediately after sealing and subsequently cooled. Once the packaged thermoplastic materials have been separated they can manually be placed into a box or other shipping container or conveyed to an automated packaging system. The applicants believe that the packaged thermoplastic composition is most easily handled by the end user as individual packages weighing about one pound. However, the applicants envision that the packaged thermoplastic composition could be placed in shipping containers without being cut and separated from subsequent molds and adjacent cavities.

The Thermoplastic Composition

The method of the present invention is useful for any type of thermoplastic composition, and preferably for a pressure sensitive thermoplastic composition, and most preferably for water sensitive pressure sensitive thermoplastic compositions. The composition of various hot melt adhesives is known and described in greater detail in Col. 5–12 in Rouyer et al., U.S. Pat. No. 5,257,491 incorporated herein by reference.

Water sensitive thermoplastic materials are gaining wider acceptance as companies desire to manufacture compostable, flushable, and biodegradable disposable products, the need for easily handled packaging of such materials is also becoming increasing important.

Water sensitivity is incorporated into disposable products with the use of various hydrophilic, water soluble, and water dispersible materials, some of which are truly thermoplastic while others are thermally stable additives and modifiers. Such water sensitive thermoplastic materials may be present as polymers, tackifiers, plasticizers, fillers etc. alone or in combination with other hydrophobic or hydrophilic materials. Water sensitive materials include polyamides, polyethyloxazaline, PVP, PVPA, polyvinylalcohol, polyesters such as those manufactured by Eastman Chemical Company, polymethylvinylether, as well as starch and cellulosic esters.

Water sensitive thermoplastic materials mentioned above are useful as a raw material in a variety of applications such as, but not limited to, the manufacture of nonwovens, elastomeric materials, adhesives, food containers as well as for producing breathable, biodegradable, and moisture-impermeable barrier films.

The present invention provides an economical, convenient handling, packaging method and apparatus for all such materials for any use and is not limited to the packaging of hot melt adhesives.

The Thermoplastic Film

A variety of film materials are suitable for the present invention. The composition of various thermoplastic films are described in Col. 12–14 in Rouyer et al., U.S. Pat. No. 5,257,491 incorporated herein by reference. Preferably, the film material becomes molten at or below the usage temperature of the thermoplastic material. More preferably, the film should have a sharp melting point, indicative by a high melt index relative to other films having about the same softening point. If the film is to be vacuum formed into the mold, it must possess adequate tensile and elongation characteristics so that it does not crack or tear. A variety of films are known to be suitable for vacuum forming.

The lining may also be applied to the mold as a thermoplastic composition by means of hot melt adhesive application equipment. Thus, the film materials may be any pure or compounded material that is processable and compatible with the adhesive. This is particularly an advantage when the desired film material lacks critical properties to be formed into a film off-line by traditional film forming techniques.

If the thermoplastic material to be packaged is water sensitive, preferable the film is also water sensitive. However, a film material that lacks water sensitivity may also be used serving a dual purpose of protecting the thermoplastic composition from moisture and water as well as providing a convenient means of handling such.

We claim:

1. A method for packaging thermoplastic compositions comprising the steps of:

a. lining a thermally conductive rigid mold with a first thermoplastic film such that the interface between the mold and the film is substantially free of voids, wherein said film becomes molten at or below the usage temperature of said thermoplastic composition, and said mold is in contact with ambient air;

b. dispensing a molten thermoplastic composition into the lined mold such that the distance between the center of the resulting thermoplastic mass and the nearest surface is less than about 1 inch;

c. allowing the surface of the thermoplastic composition to sufficiently cool such that it will not melt a second film disposed on the surface thereof;

d. disposing a second film on the surface of the mold to form a packaged thermoplastic composition;

e. blowing ambient air in a direction substantially perpendicular to the mold;

f. allowing the molten thermoplastic composition to cool in the presence of ambient air such that the packaged thermoplastic composition is removable from the mold;

and performing said steps in a continuous process.

2. A method of claim 1 further comprising dispensing said thermoplastic composition into the lined mold such that the shortest dimension of the resulting thermoplastic mass is less than one half the distance of the next shortest dimension.

3. The method of claim 1 wherein said film is vacuum formed into the mold.

4. The method of claim 1 wherein said first film and second film are sealed by a means selected from the group consisting of heat sealing, ultrasonically bonding, and adhesively bonding.

5. The method of claim 1 wherein the film is disposed by a means selected from the group consisting of a slot die, spray applicator, meltblown applicator, and extruder.

6. The method of claim 1 wherein the thermoplastic composition is selected from the group consisting of water sensitive materials, water dispersible materials, water soluble materials, and biodegradable materials.

7. The method of claim 1 wherein the melt index of the film is greater than about 10 g/10 minutes at 190° C.

8. The method of claim 1 wherein the molds are filled to a fixed weight.

9. The method of claim 1 wherein the thermoplastic composition is a hot melt adhesive.

* * * * *